United States Patent Office

3,153,665
Patented Oct. 20, 1964

3,153,665
PRODUCTION OF ALIPHATIC UNSATURATED NITRILES
Otto Roelen, Oberhausen-Holten, and Walter Rottig, Oberhausen-Sterkrade-Nord, Germany, assignors to Ruhrchemie Aktiengesellschaft, Oberhausen-Holten, Germany, a German corporation
No Drawing. Filed Apr. 24, 1961, Ser. No. 104,813
Claims priority, application Germany Apr. 26, 1960
5 Claims. (Cl. 260—465.3)

This invention relates to the preparation of nitriles and particularly low-molecular weight aliphatic unsaturated nitriles, such as acrylonitrile. Acrylonitrile is often commercially prepared by the reaction of propylene and ammonia with oxygen or oxygen-containing gas and steam in the presence of oxidic catalysts. Bismuth, tin, and antimony salts of molybdic acid, phosphomolybdic acid as well as bismuth phosphotungstate have been found to be particularly suitable for use as catalyst in this reaction.

In carrying out the aforesaid prior art process on a commercial scale, the use of fluidized catalyst beds has been suggested. The use of fluidized catalyst beds is desirable since the same permit particularly favorable conditions for heat removal. However, the use of fluidized catalyst beds in the acrylonitrile synthesis process has been found to be accompanied by substantial technical disadvantages particularly those associated with the serious mechanical stresses to which the catalyst mass is of necessity subjected in fluidized bed operations. A considerable portion of the catalyst particles of relatively small diameter or disintegrated to form dust, which gives rise to an additional technical problem since it is then necessary that this dust be separated from the gases leaving the synthesis reactor by means of special apparatus, as, for example, cyclone separators, etc. This, moreover, results in a continuous loss of active catalyst mass in the fluidized bed itself, which loss can only be compensated by the supply of fresh catalyst. Finally, the mechanical deterioration of the catalyst in the fluidized bed brings about a decrease in activity as well as a reduction in catalyst life.

It is known that the synthesis of acrylonitrile from propylene, ammonia, oxygen or oxygen-containing gas and steam utilizing a catalyst as described can also be carried out using fixed-bed catalysts. It has been found, however, that the reaction as carried out with fixed-bed catalysts is effective and produces favorable results only if specific operating conditions are observed and is unsatisfactory for most commercial applications.

The instant invention has as its object to provide a process for the preparation of low-molecular weight aliphatic unsaturated nitriles utilizing fixed bed catalysts.

It is a particular object of this invention to provide an economical and efficient process for avoiding the disadvantages of the prior art.

Additional objects will become apparent from the description of the process of this invention.

It has now been discovered that the preparation of low-molecular weight aliphatic unsaturated nitriles and especially of acrylonitrile can be particularly advantageously carried out by reacting an olefin and ammonia with oxygen or an oxygen-containing gas and steam in the presence of fixed-bed granular oxidic catalysts if the catalyst bed is maintained in an externally cooled reaction zone having a length of at least 5 meters and inside diameter of at least 20 mm. and if the linear flow velocity of the mixture of all of the reactants is at least 35 cm./second, based on the empty tube and normal temperature and pressure conditions. Particularly favorable results are obtained with a flow velocity of between 50 cm./second and about 200 cm./second. The catalyst bed should preferably be arranged in a reaction zone which is in excess of 10 meters in length and which preferably has an inside diameter of more than 30 mm. It is advantageous for the process of the invention that the gas mixture entering the tubular synthesis reactor contains from 10 to 25 and preferably from 15 to 20 parts by volume of olefin plus ammonia.

The process in accordance with the invention permits the use as starting materials of olefins admixed with saturated hydrocarbons having about the same number of carbon atoms, it being possible to have as much as 4 parts by volume of saturated hydrocarbons present per part by volume of olefin.

The heat removal conditions are particularly favorable when the temperature of the cooling medium is maintained at a temperature of about 10 to 50° C. and preferably about 10 to 35° C. lower than the maximum temperature of the catalyst bed.

The advantages of effecting the reaction in accordance with the invention with fixed-bed catalysts in the production of, for example, acrylonitrile by oxidation of ammonia and propylene with oxygen-containing gas in the presence of oxidic catalysts chiefly consist in a considerably extended service life of the catalyst and, moreover, in a high activity and an excellent selectivity, i.e., avoidance of undesirable side reactions. In addition, periodic regeneration of oxidic catalysts which is desirable due to a slight drop in activity brought about by deposition of carbon on the catalyst can be effected in a simple manner in the reactor itself, as, for example, by shutting off the flow of ammonia and propylene and, if desired, of the steam. Here again, the maintenance of specific temperatures is extremely simple.

For removing the heat of reaction from the reactor tubes containing the fixed-bed catalysts, the maintenance of a minimum flow velocity is an indispensable condition. The flow velocity should be sufficiently high that turbulent flow is obtained. This is achieved, for example, with a flow velocity of at least 35 cm./second, based on the empty tube and normal pressure and temperature conditions. Particularly favorable conditions are involved if the flow velocity ranges between 50 and 200 cm./second.

The particle size of the catalyst employed in the fixed-bed is likewise of critical importance. It should not be too small to avoid an excessively high resistance to the flow. It has been found that particle fractions of between about 1.5 and 6 mm. and preferably between 2 and 5 mm. offer only a relatively low resistance to the flow.

Moreover, operation with fixed-bed catalysts arranged in tubes permits the use of temperature gradients and, specifically, of both horizontal and vertical temperature gradients. The horizontal temperature gradient is defined as the temperature difference between the center of the catalyst bed and the reactor tube wall, which difference, in accordance with the invention, should range between about 10 and 50° C. and preferably between about 10 and 35° C. so that the cooling medium has a correspondingly lower temperature as compared with the center of the catalyst bed. The vertical gradient which represents the temperature difference in the cooling liquid and, as a first approach, is also present in the catalyst bed generally ranges between 3 and 10° and preferably between 3 and 5° C. By using liquid mixtures in place of a single compound on the cooling side for the removal of heat, it is possible, if desired, to realize a higher vertical temperature gradient which, for example, may be as high as about 50° C. in tubes having a length of about 10 meters.

The concentration in the total gas mixture of the ammonia and olefin together as used in accordance with the invention is preferably between 10 and 25% by volume, advantageous operation being achieved with a concentration of between 15 and 20% by volume. The olefin to be charged, as, for example, propylene, isobutylene, etc., may be a substantially 100% olefin. However, the use of a substantially pure olefin feed is not absolutely necessary, the same success being obtained with technical $C_3$ fractions, as, for example, those derived from refining or cracking processes and having an olefin concentration which may, for example, amount to only about 20%.

The invention will be described in greater detail in conjunction with the following specific example which is given for the purposes of illustration. It is not intended to limit the scope of the invention to the details of the example.

*Example*

Eight liters of a catalyst consisting of 10.7% $MoO_3$, 12.7% $Bi_2O_3$ and 76.7% silica are filled into a synthesis tube having a length of 10 meters and an inside diameter of 32 mm. The synthesis tube is electrically heated via a Diphyl jacket and is immediately arranged before an air-cooled condenser and a water-cooled condenser both being provided with collecting vessels and refrigerator means. The catalyst is prepared from a mixture of technical-grade molybdic acid containing about 85% $MoO_3$, bismuth nitrate ($Bi(NO_3)_3+5H_2O$), 29 ml. of concentrated $HNO_3$ and a pulverulent silica (76.6%) known under the trade name of "Aerosil unpressed." After the addition of sufficient amounts of water to the starting components, the paste-like mass is shaped, using a perforated plate, into small cylinders of 5 mm. diameter and about 1 to 5 mm. length. The catalyst cylinders are thereafter dried for 24 hours at 105° C. and then calcined for 1 hour at 300° C. 1200 normal liters/hr. of air are saturated with water vapor in a saturator which is maintained at a temperature of 66° C. and passed into the synthesis tubular reactor. 180 normal liters of a $C_3$ gaseous mixture which contains 62% propylene (5.1 mols/hr.), the balance being propane and small amounts of $C_2$ hydrocarbons, and 76 normal liters (3.45 mols/hr.) of ammonia are also admitted into the tubular reactor. The addition of the $C_3$ hydrocarbons to the gas stream is effected just before admission thereof into the synthesis tube. The temperature in the region between the saturator and the tubular reactor is maintained at about 100° C. to prevent any condensation of water.

Condensation of the reaction products first takes place by passage of the reaction gas into the air-cooled condenser maintained at 45° C., and thereafter by passing through the water-cooled condenser maintained at 18° C. The residual gas is thereafter successively passed through three refrigerating traps. The temperature of the first trap is maintained at −18° C. and that of the following traps at −70° C. More than 96% of the total amount of water (about 10 liters/24 hrs.) are recovered in the first two steps of the condensation. The results are given below.

Substantially all of the acrylonitrile in addition to the balance of the water is obtained by intense cooling. While the $NH_3$ content of the water obtained in the condensers operated at a temperature above 0° C. is about 1%, that of the water obtained by intense cooling is found to be between 15% and 20% by weight.

At a synthesis temperature of 377° C. (as measured in the Diphyl jacket) and a pressure of about 0.6 atmospheres gauge, a propylene conversion of 60% and an ammonia conversion of 86% are attained. The yield of raw acrylonitrile is 2980 grams of which 276 grams are hydrogen cyanide (9.3%) and 415 grams are acetonitrile (13.9%). About 1.5% of the reaction liquor consists of small amounts of acetonitrile and, in addition, pyridine bases.

If a pressure of 2.5 kg./cm.$^2$ gauge instead of 0.6 kg./cm.$^2$ gauge is utilized in the reaction, the $NH_3$ conversion under otherwise unchanged conditions increases to 92% and the propylene conversion to 65%. The yield of raw acrylonitrile is 3220 grams of which 305 grams (9.5) are hydrogen cyanide and 410 grams (12.7%) are acetonitrile. The amount of acetonitrile soluble in the reaction liquor is unchanged as compared with the results previously obtained. A further increase in pressure to 5 kg./cm.$^2$ gauge results in substantially no change in the synthesis results.

If a saturation temperature of 40° C. is used instead of 66° C. (at a pressure of 0.6 kg./cm.$^2$ gauge), the $NH_3$ and propylene conversions are slightly increased, i.e., from 4 to 5%. However, the side reactions, especially the oxidation of propylene to form CO and $CO_2$ is likewise increased markedly. When the saturation temperature increases to about 80° C., the conversion drops by about 10% and the extent of the side reactions, i.e., the formation of hydrogen cyanide and the formation of CO and $CO_2$, is reduced to a still higher degree.

We claim:

1. In the process for the preparation of low molecular weight unsaturated nitriles selected from the group consisting of acrylonitrile and methacrylonitrile by reacting in the vapor phase an olefin selected from the group consisting of propylene and isobutylene, respectively, ammonia, a gas containing free oxygen and steam, with a catalyst selected from the group consisting of the bismuth, tin and antimony salts of phosphomolybdic and molybdic acids and bismuth phosphotungstate in the form of a fixed bed thereof, the improvement of passing the olefin, amomnia, gas containing free oxygen and steam in turbulent gas flow into and through said reaction zone at a flow velocity of at least 35 cm. sec., calculated with respect to the empty reaction zone at normal pressure and temperature, said reaction zone having a length of at least 5 meters and an inner diameter of at least 20 mm.

2. Improvement according to claim 1 which comprises passing the olefin, ammonia and oxygen containing gas and steam into and through said reaction zone at a flow velocity of between 35 and 200 cm. sec., calculated with respect to the empty reaction zone at normal pressure and temperature.

3. Improvement according to claim 1 wherein said reaction zone has a length of from 5–10 meters and an inside diameter of from 20–65 mm.

4. Improvement according to claim 1 wherein said gaseous admixture of olefin, ammonia, oxygen-containing gas, and steam contains from 10 to 25 parts by volume of olefin and ammonia.

5. Improvement according to claim 1 which comprises maintaining in said reaction zone a horizontal temperature gradient of about 10 to 50 degrees C.

References Cited in the file of this patent

UNITED STATES PATENTS 2,904,580    Idol ------------------ Sept. 15, 1959